United States Patent [19]
Gay et al.

[11] 3,721,317
[45] March 20, 1973

[54] RETRACTABLE WINDING MECHANISM FOR ELASTIC MOTORS

[75] Inventors: Derek J. Gay, Palos Verdes Peninsula, Calif.; William H. Smedley, Garden Grove, Calif.

[73] Assignee: Mattel, Inc., Hawthorne, Calif.

[22] Filed: June 3, 1971

[21] Appl. No.: 149,427

[52] U.S. Cl. ................... 185/39, 185/DIG. 1, 46/78
[51] Int. Cl. .......................... F03g 1/08, A63h 27/00
[58] Field of Search .185/39, 37, DIG. 1, 40 M, 40 A; 46/78, 84

[56] References Cited

UNITED STATES PATENTS

| 1,302,342 | 4/1919 | Farb | 185/40 M |
|---|---|---|---|
| 2,568,136 | 9/1951 | Weimer | 46/78 UX |
| 3,080,942 | 3/1963 | Hunt | 185/39 |
| 3,111,785 | 11/1963 | McRoskey et al. | 185/39 X |
| 3,137,366 | 6/1964 | Rassier | 185/39 |

*Primary Examiner*—Edgar W. Geoghegan
*Attorney*—Seymour A. Scholnick

[57] ABSTRACT

A winding mechanism for an elastic motor includes a manually actuatable winding element for rotating a rotatable member connectable to the elastic motor, a one-way drive device for transmitting drive in a first direction from the winding element to the rotatable member but not in the reverse direction to the first direction and including means for preventing reverse rotation of the rotatable member and means for automatically returning the winding element into its initial position after it has been moved in the first direction.

2 Claims, 9 Drawing Figures

PATENTED MAR 20 1973
3,721,317
SHEET 1 OF 2
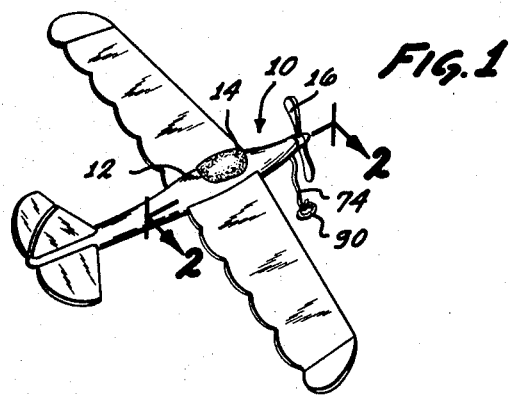
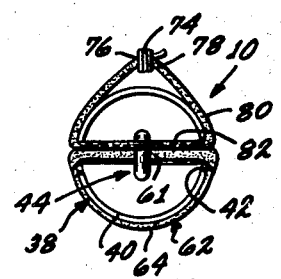
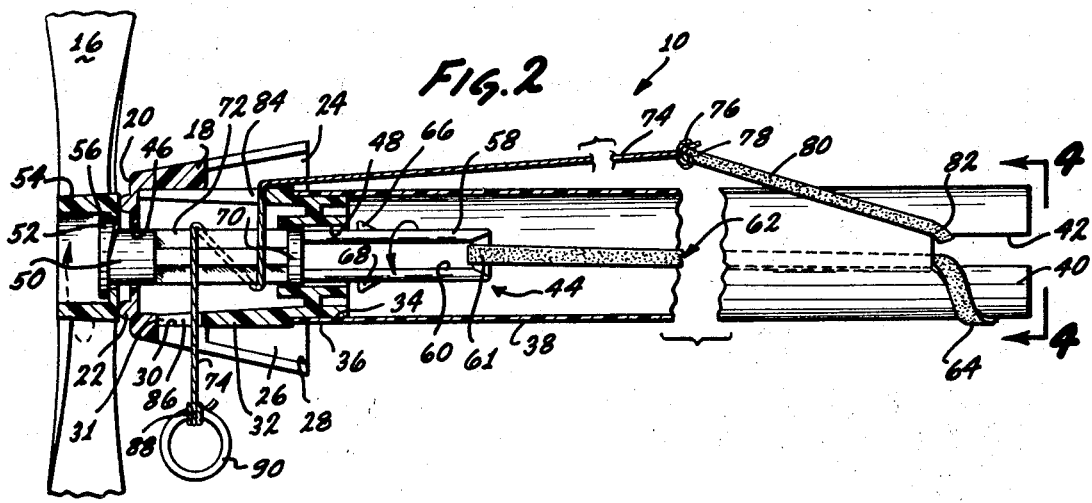
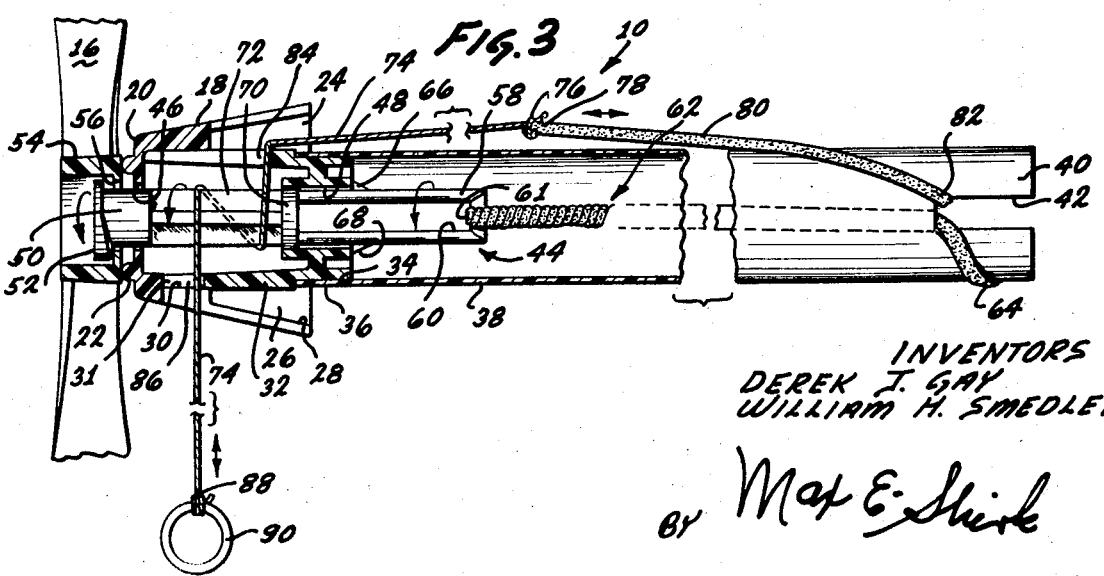
INVENTORS
DEREK J. GAY
WILLIAM H. SMEDLEY
BY Max E. Shirk
ATTORNEY

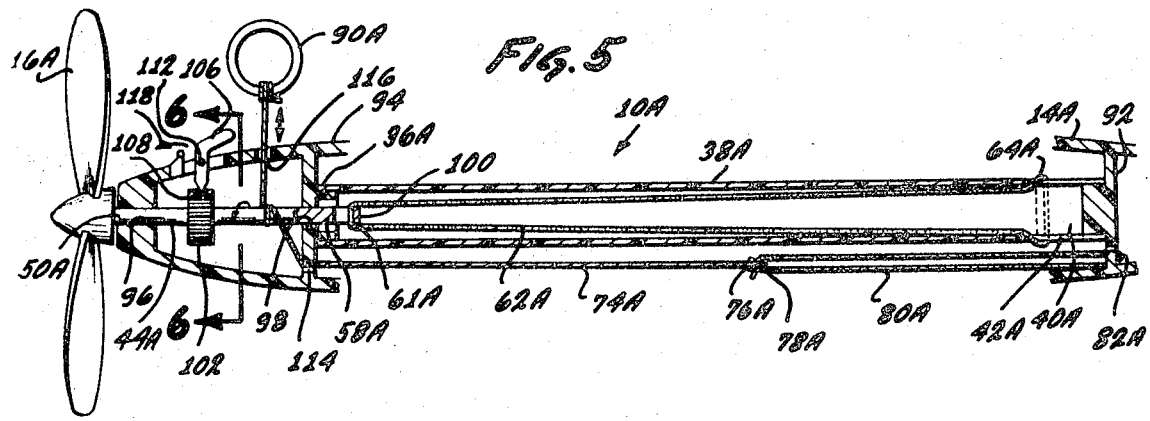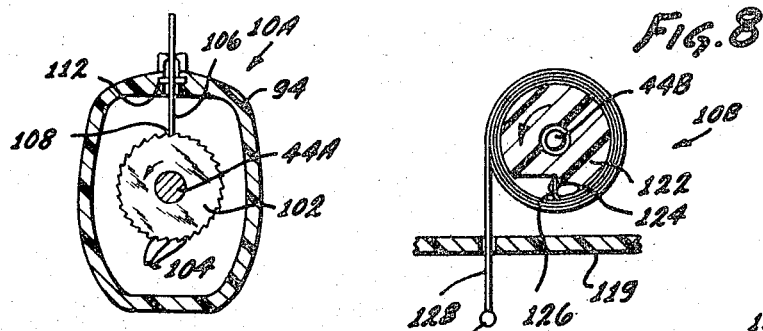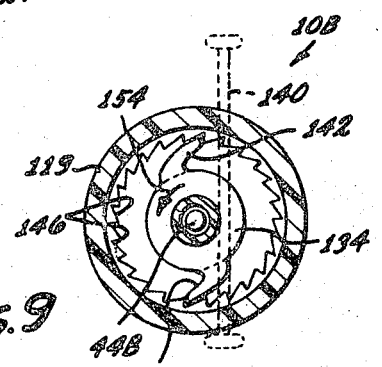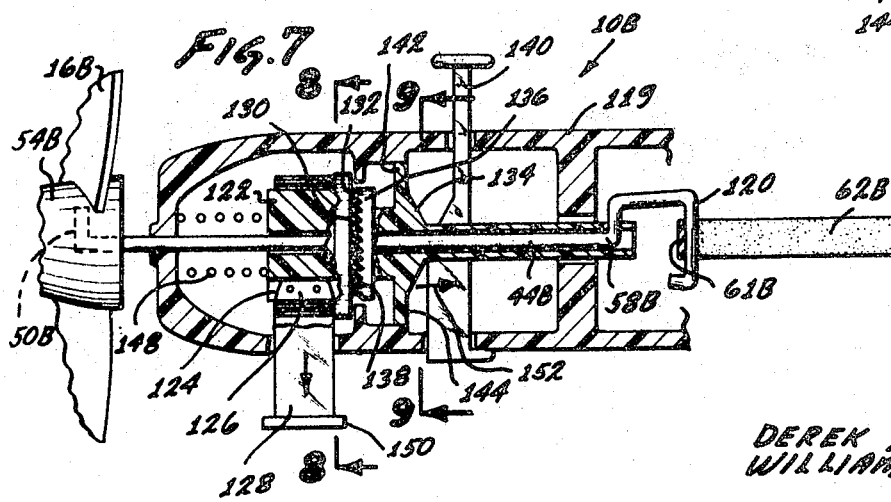

RETRACTABLE WINDING MECHANISM FOR ELASTIC MOTORS

BACKGROUND OF THE INVENTION

The background of the invention will be set forth in two parts.

FIELD OF THE INVENTION

The invention pertains generally to the field of winding mechanisms for elastic motors and more particularly to a new and useful retractable winding mechanism.

DESCRIPTION OF THE PRIOR ART

United States Pat. No. 3,137,366 gives one example of a retractable winding mechanism for elastic motors including a manually actuatable winding element for rotating a rotatable member connectable to the elastic motor, a one-way drive device for transmitting drive in a first direction from the winding element to the rotatable member but not in the reverse direction to the first direction and including means for preventing reverse rotation of the rotatable member and means for automatically returning the winding element to its initial position after it has been moved in the first direction.

SUMMARY OF THE INVENTION

It is an object of the present invention to provide a new and useful device of the type described which exemplifies improvements over the prior art devices.

It is another object of the present invention to provide a device of the type described which includes a new and improved one-way drive.

A further object of the present invention is to provide a device of the type described which includes an improved winding element.

Yet another object of the present invention is to provide a device of the type described which includes improved means for automatically returning the winding element to its initial position.

According to a first embodiment of the present invention, an elastic motor is provided in a toy airplane and includes a first rubber band having one end attached to a fixed tube and its other end connected to the inboard end of a rotatable spindle. The outboard end of the spindle carries the propeller for the airplane and includes a one-way drive means which engages the propeller hub during operation of the airplane.

The rubber band is wound by a drawstring which is looped about the spindle in such a manner that the drawstring will thrust the spindle in an outboard direction so that the one-way drive means will be disconnected from the propeller during wind-up operations. The drawstring is automatically withdrawn after each winding stroke by a second rubber band having one end affixed to the drawstring and another end affixed to the fixed tube.

A second embodiment is about like the first embodiment except that the one-way drive means includes a flexible finger swingably mounted on the airplane fuselage for engagement with a ratchet gear affixed to the spindle.

In a third embodiment, a self-coiling, plastic band is used in place of the drawstring and a shifting mechanism is employed to shift the one-way drive means into operation only during the wind-up procedure.

The features of the present invention which are believed to be novel are set forth with particularity in the appended Claims. The present invention, both as to its organization and manner of operation, together with further objects and advantages thereof, may best be understood by reference to the following description, taken in connection with the accompanying drawings in which like reference characters refer to like elements in the several views.

FIG. 1 is a perspective view of a toy airplane incorporating a retractable winding mechanism of the present invention;

FIG. 2 is an enlarged, partial cross-sectional view taken along line 2—2 of FIG. 1;

FIG. 3 is a view similar to FIG. 2, but showing the parts during a winding operation;

FIG. 4 is an end view taken along line 4—4 of FIG. 2;

FIG. 5 is a cross-sectional view of a winding mechanism constituting a second embodiment of the present invention;

FIG. 6 is an enlarged cross-sectional view taken along line 6—6 of FIG. 5;

FIG. 7 is a partial cross-sectional view of a winding mechanism constituting a third embodiment of the present invention;

FIG. 8 is a cross-sectional view taken along line 8—8 of FIG. 7; and

FIG. 9 is a cross-sectional view taken along line 9—9 of FIG. 7.

DESCRIPTION OF THE PREFERRED EMBODIMENT

Referring again to the drawings and more particularly to FIGS. 1–4, a winding mechanism constituting a first embodiment of the present invention, generally designated 10, is shown for purposes of illustration, but not of limitation, as being employed in a toy airplane 12 having a fuselage 14 and a propeller 16.

The retractable winding mechanism 10 includes a frusto-conical, front housing 18 having an outboard end 20, which carries an annular thrust bearing 22, and an open inboard end 24. Front housing 18 includes an encompassing sidewall 26 having a large-diameter portion 28, which is adapted to encompass fuselage 14, and a small-diameter portion 30, which receives the outboard end 31 of a rear housing 32 having a reduced diameter inboard portion 34 to which is affixed the outboard end 36 of a fixed, cylindrical tube 38, which, in turn, includes an inboard end 40 provided with a longitudinal slot 42.

Winding mechanism 10 also includes a spindle 44 which extends through an aperture 46 in the outboard end 20 of front housing 18 and a bushing 48 in rear housing 32. Spindle 44 includes an outboard end 50 having a tooth sector 52 provided thereon. Outboard end 50 of spindle 44 is slideably and rotatably mounted in the hub portion 54 of propeller 16 in such a manner that tooth sector 52 is selectively engageable with a tooth 56 (FIG. 3) carried by hub 54.

Spindle 44 also includes an inboard end 58 provided with an opening 60 through which the outboard end 61 of an elastic band 62 is trained. Band 62 includes an inboard end 64 which is captured by slot 42 and end 40 of tube 38. End 58 of spindle 44 carries a pair of stop members 66, 68 engageable with the inboard portion 34 of rear housing 32 to limit the outboard travel of spindle 44 to that amount necessary for disengaging gear sector 52 from tooth 56 during the winding of elastic band 62, as shown in FIG. 3.

Spindle 44 also includes a bearing 70 journalled in bushing 48 and a string-receiving portion 72.

Winding mechanism 10 also includes a drawstring 74 having an inboard end 76 connected to the outboard end 78 of an elastic member 80 which, in turn, has its inboard end 82 captured by slot 42 in end 40 of tube 38 for retracting drawstring 74 to the position shown in FIG. 2. Drawstring 74 passes through a first aperture 84 in rear housing 32, around portion 72 of spindle 44 and out through a second aperture 86 in rear housing 32. Drawstring 74 then terminates in an end 88 which carries a ring 90 adapted to be grasped by a child-user of winding mechanism 10 for pulling drawstring 74 to the position shown in FIG. 3. Aperture 86 is upstream of aperture 84 so that the pulling of drawstring 74 not only rotates the spindle 44, but also slides it in an outboard direction until stops 66, 68 engage portion 34 of rear housing 32. If propeller 13 is held in the position shown in FIG. 3 during this sliding movement of spindle 44, gear sector 52 disengages from tooth 56 so that spindle 44 may be rotated without also rotating propeller 16. Rotation of spindle 44 twists and thereby tensions elastic band 62. Drawstring 74 rotates spindle 44 as a limited amount for each pull on ring 90. Then, when ring 90 is released, the tension in elastic band 62 pulls spindle 44 in an inboard direction until gear sector 52 engages tooth 56. When ring 90 is released, drawstring 74 loses its tension permitting elastic member 80 to retract drawstring 74 to the position shown in FIG. 2.

Drawstring 74 may be stroked several times until elastic band 62 is sufficiently tensioned to rotate propeller 16 for powering a suitable flight of airplane 12.

Gear sector 52 and tooth 56 comprise a one-way drive device of simple, economical construction not obtainable where propeller 16 is permanently fixed to the member corresponding to spindle 44 in some prior art elastic motors.

The winding mechanism 10 may be fully assembled and inserted into fuselage 14 of airplane 12 as an operating unit.

Referring now to FIGS. 5 and 6, a winding mechanism constituting a second embodiment of the present invention generally designated 10A, includes a fixed tube 38A having an inboard end 40A affixed to a rear portion 92 of a fuselage 14A forming part of a toy airplane, not shown. Tube 38A also includes an outboard end 36A which is affixed to the front fuselage portion 94 of a toy airplane, not shown.

Front fuselage portion 94 includes an outboard bearing 96 and an inboard bearing 98 in which a spindle 44A is rotatably mounted. A propeller 16A is affixed to the outboard end 50A of spindle 44A and an elastic band 62A has its outboard end 61A affixed to the inboard end 58A of spindle 44A by a hook 100. The inboard end 64A of band 62A is trained through a longitudinal slot 42A provided in inboard end 40A of tube 38A.

A ratchet gear 102 is affixed to spindle 44A and includes teeth 104 angled in the direction shown in FIG. 6. Teeth 104 are engaged by a pawl 106 having a flexible ratcheting finger 108. Pawl 106 is pivotally mounted in fuselage 94 on a pin 112 so that it may be swung to the position shown in FIG. 5 for winding operations and to a released position when it is desired to permit elastic band 62A to rotate propeller 16A.

Winding mechanism 10A also includes a drawstring 74A having its inboard end 76A connected to the outboard end 78A of an elastic member 80A having its inboard end 82A secured to fuselage portion 92 for retracting drawstring 74A to the position shown in FIG. 5 at the end of each winding stroke. Drawstring 74A is trained through apertures 114, 116 in fuselage portion 94 and is also trained about spindle 44A for rotating it when drawstring 74A is tensioned by grasping pull ring 90A and withdrawing drawstring 74A from fuselage portion 94. This rotates ratchet gear 102 in a counter-clockwise direction, as viewed in FIG. 6, permitting finger 108 to slide over teeth 104.

When pull ring 90A is released, finger 108 prevents gear 102 from rotating in a clockwise direction and drawstring 74A is retracted by elastic member 80A. Pawl 106 may then be swung in the direction of arrow 118 (FIG. 5) bringing finger 108 out of engagement with gear 102, thereby releasing spindle 44A so that elastic band 62A will rotate propeller 16A.

Referring now to FIGS. 7-9, a winding mechanism constituting a third embodiment of the present invention, generally designated 10B, includes a spindle 44B rotatably mounted in a fuselage portion 119 of a toy airplane, not shown. Spindle 44B includes an outboard portion 50B affixed to the hub 54B of a propeller 16B and an inboard end 58B formed with a hook portion 120 engaged by the outboard end 61B of an elastic band 62B.

A winding drum 122 is rotatably mounted on spindle 44B and is provided with a shoulder 124 to which an end 126 of a self-recoiling, plastic strip 128 is affixed. Strip 128 may be made from any suitable material, such as polyethylene terephthalate and is of sufficient length to normally coil itself about drum 122 four or five turns.

Drum 122 includes an inboard face 130 which carries a plurality of ratchet teeth 132 engageable with a one-way drive member 134 affixed to spindle 44B. One-way drive member 134 includes an upstream face 136 having ratchet teeth 138 provided thereon for engagement with teeth 132 on drum 122 when a caming lever 140 is moved to the position shown in FIG. 7. This also brings a pair of fingers 142, 144, which are carried by member 134, into engagement with ratchet teeth 146 extending around the inner periphery of fuselage portion 119. Fingers 142, 144 and teeth 146 prevent reverse rotation of spindle 44B at the end of each winding stroke and a light coil spring 148 permits teeth 132 on drum 122 to slip over teeth 138 on member 134 during retraction of strip 128 at the end of a winding stroke when the handle portion 150 of strip 128 is released. Strip 128 may be withdrawn from fuselage portion 119 a sufficient number of times to fully wind elastic band 62B. Lever 140 may then be depressed permitting band 62A to move spindle 44B to the right in the direction of arrow 152 sufficiently to bring member 134 out of engagement with drum 122. Band 62B is then free to rotate propeller 16B through spindle 44B.

When strip 128 is pulled for a winding stroke, member 134 is rotated in the direction of arrow 154 in FIG. 9 imparting rotation to spindle 44B and elastic band 62B.

While the particular retractable winding mechanisms herein shown and described in detail are fully capable of attaining the objects and providing the advantages hereinbefore stated, it is to be understood that they are merely illustrative of the presently-preferred embodiments of the invention and that no limitations are intended to the details of construction or design herein shown other than as defined in the appended claims.

The various arrows in the drawings indicate the direction of motion of the surfaces or elements near which they are placed.

What is claimed is:

1. A winding mechanism for an elastic motor including a manually actuatable winding element for rotating a rotatable member connectable to the elastic motor, a one-way drive device for transmitting drive in a first direction from the winding element to the rotatable member but not in the reverse direction to the first direction and including means for preventing reverse rotation of the rotatable member, and means for automatically returning the winding element into its initial position after it has been moved in said first direction, characterized in that said one-way drive device, comprises:
   a ratchet gear affixed to said rotatable member; and
   a pawl rotatably mounted on said winding mechanism for selective engagement with said ratchet gear, said winding element and said means for automatically returning said winding element into its initial position, comprising
   a drawstring looped about said rotatable member and an elastic member connected to said drawstring.

2. A winding mechanism for an elastic motor including a manually actuatable winding element for rotating a rotatable member connectable to the elastic motor, a one-way drive device for transmitting drive in a first direction from the winding element to the rotatable member but not in the reverse direction to the first direction and including means for preventing reverse rotation of the rotatable member, and means for automatically returning the winding element into its initial position after it has been moved in said first direction, characterized in that said one-way drive device, comprises:
   a ratchet gear affixed to said rotatable member; and
   a pawl rotatably mounted on said winding mechanism for selective engagement with said ratchet gear,
   said winding element and said means for automatically returning said winding element into its initial position, comprising
   a drum rotatably mounted on said rotatable member, said drum being provided with ratchet teeth engageable with said one-way drive device for imparting rotation thereto when said drum is rotated in engagement therewith; and
   a self-coiling plastic strip affixed to said drum, said strip being normally coiled about said drum and being withdrawable from said drum for imparting rotation thereto and to said one-way drive device through said ratchet teeth; and
   a caming lever for shifting said one-way drive device into engagement with said ratchet teeth.

* * * * *